US 11,594,349 B2

(12) United States Patent
Chae et al.

(10) Patent No.: US 11,594,349 B2
(45) Date of Patent: Feb. 28, 2023

(54) POWER CABLE JOINT SYSTEM (71) Applicant: LS CABLE & SYSTEM LTD., Anyang-si (KR)

(72) Inventors: Byung Ha Chae, Seoul (KR); Chae Hong Kang, Gumi-si (KR); Si Ho Son, Daegu (KR); Seung Myung Choi, Gumi-si (KR); Myeong Seok Kang, Gumi-si (KR); Young June Park, Daegu (KR); Ho Jung Yun, Seoul (KR); Kuniaki Sakamoto, Gumi-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 106 days.

(21) Appl. No.: 17/291,209

(22) PCT Filed: Oct. 25, 2019

(86) PCT No.: PCT/KR2019/014134
§ 371 (c)(1),
(2) Date: May 4, 2021

(87) PCT Pub. No.: WO2020/096243
PCT Pub. Date: May 14, 2020

(65) Prior Publication Data
US 2022/0130575 A1 Apr. 28, 2022

(30) Foreign Application Priority Data

Nov. 7, 2018 (KR) .................. 10-2018-0135918
Oct. 23, 2019 (KR) .................. 10-2019-0131855

(51) Int. Cl.
*H01B 9/02* (2006.01)
*H01B 7/02* (2006.01)
(Continued)

(52) U.S. Cl.
CPC .......... *H01B 9/027* (2013.01); *H01B 7/0208* (2013.01); *H02G 15/14* (2013.01); *H02G 15/1806* (2013.01)

(58) Field of Classification Search
CPC ........ H01B 9/027; H01B 7/0208; H01B 7/02; H02G 15/14; H02G 15/08; H02G 15/1806; H02G 15/18; H02G 15/196; H02G 15/184
See application file for complete search history.

(56) References Cited

U.S. PATENT DOCUMENTS

| 4,520,229 A | * | 5/1985 | Luzzi | H02G 15/184 |
| | | | | 174/73.1 |
| 4,589,939 A | * | 5/1986 | Mohebban | H02G 15/18 |
| | | | | 439/933 |

(Continued)

FOREIGN PATENT DOCUMENTS

CN  101902024 B  10/2014
CN  102664380 B  1/2015

(Continued)

OTHER PUBLICATIONS

Supplementary European Search Report for related European Application No. 19881288.5; action dated Jul. 4, 2022 (10 pages).

(Continued)

*Primary Examiner* — Hoa C Nguyen
*Assistant Examiner* — Amol H Patel
(74) *Attorney, Agent, or Firm* — K&L Gates LLP (57) ABSTRACT The present disclosure relates to a power cable joint system capable of minimizing expansion, deformation or damage of a metal sheath restoration layer, which is formed of a material such as lead sheath, due to internal expansion due to heat generated in an intermediate connection part of the power cable joint system.

20 Claims, 6 Drawing Sheets (51) Int. Cl.
*H02G 15/14* (2006.01)
*H02G 15/18* (2006.01)
*H02G 15/196* (2006.01)
*H02G 15/184* (2006.01)

(56) References Cited

U.S. PATENT DOCUMENTS

| | | | | |
|---|---|---|---|---|
| 6,281,442 B1* | 8/2001 | Guzowski | ............ | H02G 15/103 |
| | | | | 174/84 R |
| 2004/0099434 A1* | 5/2004 | Balconi | ................ | H02G 15/184 |
| | | | | 174/88 R |
| 2014/0246220 A1* | 9/2014 | Allais | ...................... | H01B 1/24 |
| | | | | 977/932 |
| 2015/0122546 A1* | 5/2015 | Saugrain | .............. | H02G 15/184 |
| | | | | 174/84 R |
| 2015/0334887 A1* | 11/2015 | Dinu | ................... | H05K 9/0007 |
| | | | | 174/106 SC |
| 2018/0198269 A1* | 7/2018 | Marthinsen | .......... | H02G 15/003 |
| 2018/0309273 A1* | 10/2018 | Caimi | .................. | H02G 1/1273 |
| 2019/0341762 A1* | 11/2019 | Salame | ................ | H02G 15/184 |
| 2019/0372320 A1* | 12/2019 | Pozzati | ............. | B29C 45/14467 |

FOREIGN PATENT DOCUMENTS

| | | |
|---|---|---|
| JP | 05015631 U | 2/1993 |
| JP | H11122792 A | 4/1999 |
| JP | 2010104122 A | 5/2010 |
| KR | 1020150097364 A | 8/2015 |
| KR | 101830030 B1 | 2/2018 |

OTHER PUBLICATIONS

International Search Report for related International Application No. PCT/KR2019/014134; report dated May 14, 2020 (5 pages).
Written Opinion for related International Application No. PCT/KR2019/014134; report dated May 14, 2020; (5 pages).

* cited by examiner

POWER CABLE JOINT SYSTEM

CROSS-REFERENCE TO RELATED APPLICATIONS

The present application is a National Stage of International Application No. PCT/KR2019/014134 filed on Oct. 25, 2019, which claims the benefit of Korean Patent Application No. 10-2018-0135918 filed on Nov. 7, 2018, and Korean Patent Application No. 10-2019-0131855 filed Oct. 23, 2019, filed with the Korean Intellectual Property Office, the entire contents of each hereby incorporated by reference.

FIELD

The present disclosure relates to a power cable joint system. More particularly, the present disclosure relates to a power cable joint system capable of minimizing expansion, deformation or damage of a metal sheath restoration layer, which is formed of a material such as lead sheath, due to internal expansion due to heat generated in an intermediate connection part of the power cable joint system.

BACKGROUND

Power cables that are used to supply power may be divided into a paper-insulated cable impregnated with insulating oil and an XPLE cable according to a material of an insulating layer outside a conductor.

Power cables may be connected using a joint box or the like according to a length of cables to be laid. A joint box of a power cable impregnated with insulating oil may be configured in the form of a housing with a protective copper tube and the like.

Power cables may be connected at a middle connection point through the joint box and a considerable amount of time is required therefor.

When power cables are laid at the sea bottom, the power cables are laid using a ship for laying cables and power-cable intermediate connection may be also performed using the ship for laying cables.

Specifically, when submarine power cables are connected through the joint box, the submarine cables cannot be wound around a turntable of the ship or the like because the joint box is large in volume and is not flexible, and thus should be intermediately connected in the ship in units of unit lengths and thereafter laid at the sea bottom, thereby significantly increasing time and costs.

In order to solve this problem, recently, the study and application of a flexible joint structure (hereinafter referred to as "flexible joint") are being increased in the field of submarine cables.

The flexible joint refers to a connection structure that is different from a general joint box, has an outer diameter substantially the same as that of a cable and is bendable freely.

When the flexible joint or the like is applied, the outer diameter and flexibility of the flexible joint are similar to those of a cable and thus cables that are connected may be laid by being continuously wound around the turntable of a ship for laying submarine cables.

Figure 6:
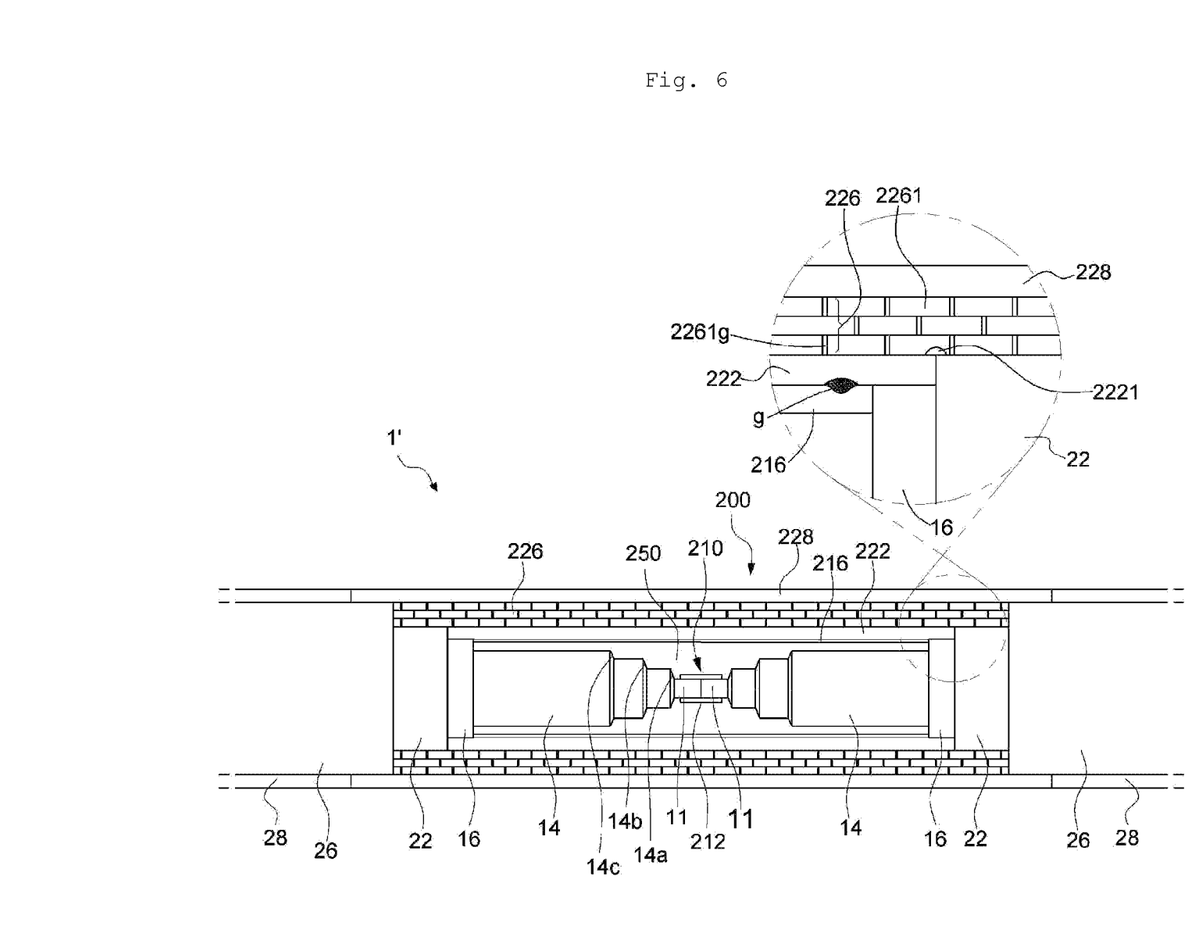
FIG. 6 is a cross-sectional view of a power cable joint system of the related art.

FIG. 6 illustrates an internal structure of an intermediate connection part 200 for flexible connection of a pair of power cables.

A pair of power cables may be connected through the intermediate connection part 200 in a state in which conductors 11, inner semiconducting layers (not shown), cable insulating layers 14, outer semiconducting layers 16, metal sheaths 22, metal strip layers 26, etc. are exposed and ends of the pair of power cables face each other. The intermediate connection part 200 may include: a conductor connection part 210 for connecting ends of a pair of the conductors 11 by welding or a conductor sleeve 212, a reinforcing insulating layer 250 surrounding the conductor connection part 210 and the cable insulating layers 14, an outer semiconducting restoration layer 216 surrounding the reinforcing insulating layer 250, a metal sheath restoration layer 222 covering an outer side of the outer semiconducting restoration layer 216, a metal strip restoration layer 226 provided outside the metal sheath restoration layer 222, an outer sheath restoration layer 228 provided outside the metal strip restoration layer 226, an armor restoration layer 300 provided outside the outer sheath restoration layer 228, and the like.

The armor restoration layer 300 of the intermediate connection part 200 is a component needed when the power cable 100 includes an armor 30 and is laid at the sea bottom. When the armor 30 of the power cable is omitted, the power cable may be an underground power cable and the armor restoration layer 300 of the intermediate connection part 200 may be omitted.

The reinforcing insulating layer 250, the outer semiconducting restoration layer 216, the metal sheath restoration layer 222, the metal strip restoration layer 226, the outer sheath restoration layer 228, and the armor restoration layer 300 may be formed of materials that are the same as or similar to those of the cable insulating layers 14, the outer semiconducting layers 16, the metal sheaths 22, the metal strip restoration layers 26, the outer sheaths 28, and the armors 30 of the power cables 100a and 100b.

The reinforcing insulating layer 250, the outer semiconducting restoration layer 216, and the metal strip restoration layer 226 among the reinforcing insulating layer 250, the outer semiconducting restoration layer 216, the metal sheath restoration layer 222, and the metal strip restoration layer 226 of the intermediate connection part 200, excluding the metal sheath restoration layer 222, may be restored by spirally cross-winding insulating paper, a semiconductive tape, a metal strip, or the like by the same method as the components of the power cable corresponding thereto.

The metal sheaths 22 of the power cables 100a and 100b are sealing means for preventing the permeation of foreign substances such as moisture into the power cables 100a and 100b and the loss of insulating oil, and may be formed of a material such as a thin lead sheath.

Thus, because it is difficult to ensure sealing the metal sheath restoration layer 222, for restoring the metal sheath 22, against the inner pressure of the insulating oil, the metal sheath restoration layer 222 cannot be restored by spirally cross-winding a lead sheath or the like and may be formed by first disposing a lead sheath tube corresponding to a length of the intermediate connection part 200 on a side of the pair of power cables 100a and 100b to be connected, restoring the outer semiconducting restoration layer 216 and the like, moving the lead sheath tube to a position of the intermediate connection part 200, performing tube reduction on the lead sheath tube, and soldering the lead sheath tube and an end of the metal sheath 22 to form a lead sheath 2221.

After the restoring of the metal sheath restoration layer 222 is completed, a metal strip is cross-wound to restore the metal strip restoration layer 226 and the outer sheath restoration layer 228 and the armor restoration layer 300 may be sequentially restored outside the metal strip restoration layer 226 to complete the intermediate connection part 200 in the form of a flexible joint.

In the case of the intermediate connection part 200 in the form of flexible joint, it is possible to connect the intermediate connection part 200 at a factory but a clearance or void may occur between inner layers of the intermediate connection part 200 during restoring of a power cable connection part similar to the configuration of a power cable.

As described above, the metal sheath restoration layer 222 is formed of the lead sheath tube or the like, and is disposed on one of the power cables 100a and 100b before restoring the conductor connection part 210, the reinforcing insulating layer 250, the outer semiconducting restoration layer 216, etc., and moved and fixed on the position of the intermediate connection part 200 after connection and restoration of the conductor connection part 210, the reinforcing insulating layer 250, the outer semiconducting restoration layer 216, etc.

Therefore, a certain degree of tolerance is required for an inner diameter of the lead sheath tube, and even when the metal sheath restoration layer 222 is completed by fixing the lead sheath tube on the metal sheaths 22 of the power cables 100a and 100b and contracting the lead sheath tube using a roller or the like, the lead sheath tube cannot be formed in close contact with the outer semiconducting restoration layer 16 and the like, unlike the metal sheaths 22 of the power cables 100a and 100b.

Therefore, there may be a gap g or cracks between the metal sheath restoration layer 222 and the outer semiconducting restoration layer 216, and when the insulating oil is gathered via the gap g or cracks during the use of the power cables 100a and 100b and temperature of the insulating oil increases and the insulating oil expands due to heat generated during operation of the power cables 100a and 100b, a flow rate of the insulating oil increases and at the same time, the metal sheath restoration layer 222 may easily swell.

Figure 3:
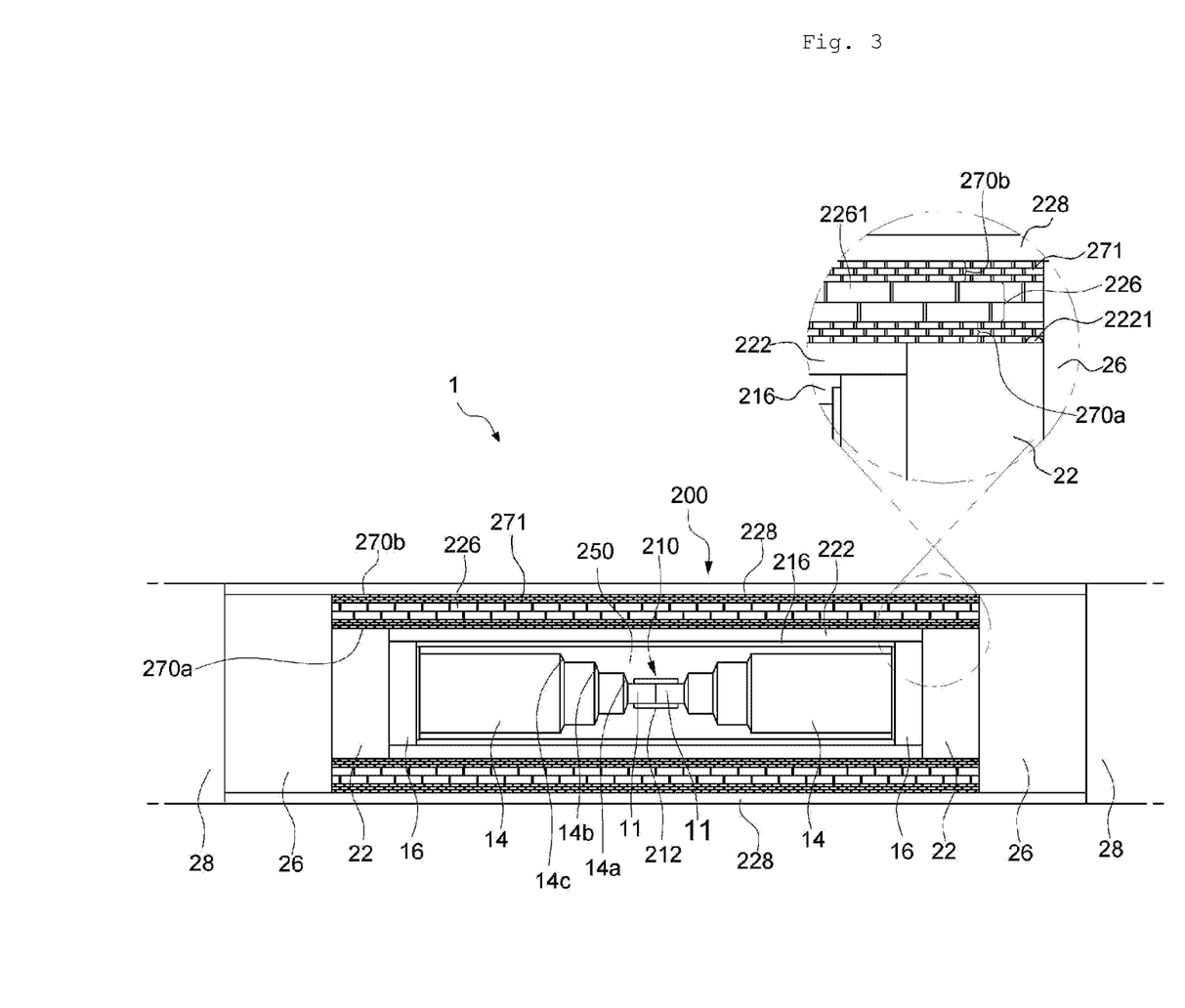
FIG. 3 is a cross-sectional view of a power cable joint system according to an embodiment of the present disclosure.

In addition, the metal strip restoration layer 226 is provided outside the metal sheath restoration layer 222. The metal strip restoration layer 226 may be restored by a method of cross-winding metal strips or the like but a width and thickness of the metal strips are large, and thus, the lead sheath used to form the metal sheath 22 may easily deform according to a shape of the metal strip restoration layer 226 (e.g., irregularities due to a gap 2261g between metal strips as illustrated in FIG. 3) or the like when the metal sheath restoration layer 222 expands, and stress may be concentrated on a bent portion of the intermediate connection part 200 when the intermediate connection part 200 is repeatedly bent.

SUMMARY

The present disclosure is directed to providing a power cable joint system capable of minimizing expansion, deformation or damage of a metal sheath restoration layer, which is formed of a material such as lead sheath, due to internal expansion due to heat generated in an intermediate connection part of the power cable joint system.

The present disclosure provides power cable joint system comprising a pair of power cables and an intermediate connection part for connection of the pair of power cables, wherein each of the pair of power cables comprises: a conductor; a cable insulating layer disposed outside the conductor; an outer semiconducting layer surrounding the cable insulating layer; a metal sheath disposed outside the outer semiconducting layer; and a metal strip layer disposed outside the metal sheath, and the conductor, the cable insulating layer, the outer semiconducting layer, the metal sheath, and the metal strip layer of each of the pair of power cables are exposed in the intermediate connection part, and the intermediate connection part comprises: a conductor connection part to which the conductor of each of the pair of power cables are connected; a reinforcing insulating layer surrounding the conductor connection part and at least a portion of the cable insulating layer; an outer semiconducting restoration layer disposed outside the reinforcing insulating layer; a metal sheath restoration layer disposed outside the outer semiconducting restoration layer; and a taping layer provided to a perimeter of the metal sheath restoration layer.

And the taping layer may comprise a taping layer configured to be provided to the metal sheath restoration layer and at least a portion of the perimeter of the exposed metal sheath of each of the pair of power cables.

And the taping layer may be formed by providing a fiber reinforced tape in a circumferential direction while forming gaps at predetermined intervals in a longitudinal direction of an outer circumferential surface of the metal sheath restoration layer.

And the taping layer may be formed by providing the fiber reinforced tape in the form of rings or a spiral form.

And the taping layer may be formed in two to four layers.

And fiber reinforced tapes constituting one of the layers of the taping layer may be provided to a location appropriate to block a gap between layers of the taping layer adjacent in a vertical direction.

And a gap between the fiber reinforced tapes corresponding to the layers of the taping layer may be adjusted such that a ratio of a width of regions of the fiber reinforced tapes, which overlap each other without a gap, to a width of the fiber reinforced tapes in a direction of a diameter of the power cable is in a range of 25% to 35%.

And the taping layer may be provided to continuously cover ends of the metal sheaths, which are exposed for intermediate connection, of the pair of power cables and the outer circumferential surface of the metal sheath restoration layer.

And the intermediate connection part may further comprise a metal strip restoration layer including metal strips constituting the metal strip layer and continuously wound around an upper portion of the taping layer.

And in the intermediate connection part, the taping layer including the fiber reinforced tape may be provided to an outer circumferential surface of the metal strip restoration layer.

And the intermediate connection part further comprises an outer sheath restoration layer, which uses a thermal contraction tube, outside the metal strip restoration layer.

And the pair of power cables each further comprise a cable armor outside the metal strips or the outer sheath, the cable armor including armor wires and a serving layer outside the armor wire, and the intermediate connection part may further comprise an armor restoration layer outside the metal strip restoration layer or the outer sheath restoration layer, the armor restoration layer including a connection wire for connecting the armor wires of the pair of power cables and a serving restoration layer.

And a fiber reinforced tape constituting the taping layer may comprise a fiber reinforced tape formed of a resin material to which an FRP fiber is added.

And an outer diameter of the intermediate connection part of the power cable joint system may be 1.05 times or less than that of the power cable.

And the present disclosure provides power cable joint system comprising a pair of power cables and an intermediate connection part for connection of the pair of power cables, wherein each of the pair of power cables comprises: a conductor; a cable insulating layer disposed outside the conductor; an outer semiconducting layer surrounding the cable insulating layer; a metal sheath disposed outside the outer semiconducting layer; and a metal strip layer disposed outside the metal sheath, wherein the conductor, the cable insulating layer, the outer semiconducting layer, the metal sheath, and the metal strip layer of each of the pair of power cables are exposed in the intermediate connection part, and the intermediate connection part comprises: a conductor connection part to which connectors of the pair of power cables are connected; a reinforcing insulating layer surrounding the conductor connection part and at least a portion of the cable insulating layer; and outer semiconducting restoration layer outside the reinforcing insulating layer; a metal sheath restoration layer outside the outer semiconducting restoration layer; metal strips used to form metal strip restoration layers of the pair of power cables and continuously wound around an upper portion of the metal sheath restoration layer; and a taping layer provided to an outer circumferential surface of the metal strip restoration layer.

And the taping layer may be formed by providing a fiber reinforced tape in a circumferential direction while forming gaps at predetermined intervals in a longitudinal direction of an outer circumferential surface of the metal sheath restoration layer.

And the taping layer may be formed by providing a fiber reinforced tape in the form of rings or a spiral form.

And the taping layer may be formed in two to four layers.

And fiber reinforced tapes constituting one of the layers of the taping layer are provided to a location appropriate to block a gap between layers of the taping layer adjacent in a vertical direction.

And a gap between the fiber reinforced tapes corresponding to the layers of the taping layer may be adjusted such that a ratio of a width of regions of the fiber reinforced tapes, which overlap each other without a gap, to a width of the fiber reinforced tapes in a direction of a diameter of the power cable is in a range of 25% to 35%.

And the intermediate connection part may further comprise an outer sheath restoration layer including a thermal contraction tube disposed outside the metal strip restoration layer.

And the pair of power cables each further comprise a cable armor outside the metal strips or the outer sheath, the cable armor including armor wires and a serving layer outside the armor wire, and the intermediate connection part may further comprise an armor restoration layer outside the metal strip restoration layer or the outer sheath restoration layer, the armor restoration layer including a connection wire for connecting the armor wires of the pair of power cables and a serving restoration layer.

And a fiber reinforced tape constituting the taping layer may comprise a fiber reinforced tape formed of a resin material to which an FRP fiber is added.

And an outer diameter of the intermediate connection part of the power cable joint system may be 1.05 times or less than that of the power cable.

In a power cable joint system according to the present disclosure, the expansion or deformation of a metal sheath restoration layer due to heat generated in a connection part of conductors of a pair of power cables connected through an intermediate connection part can be suppressed.

In addition, in the power cable joint system according to the present disclosure, a thickness of a taping layer is not large and thus an increase in a thickness of an intermediate connection part can be minimized and the reliability, stability, and durability of the power cable joint system can be improved.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

In general, cables impregnated with insulating oil are connected through a joint box at intervals of several hundreds of meters or several kilometers and the ends thereof are connected to an overhead line through the joint box. First, a power cable 100 impregnated with insulating oil and a power cable joint system 1 for connection of such power cables will be described below.

Figure 1:
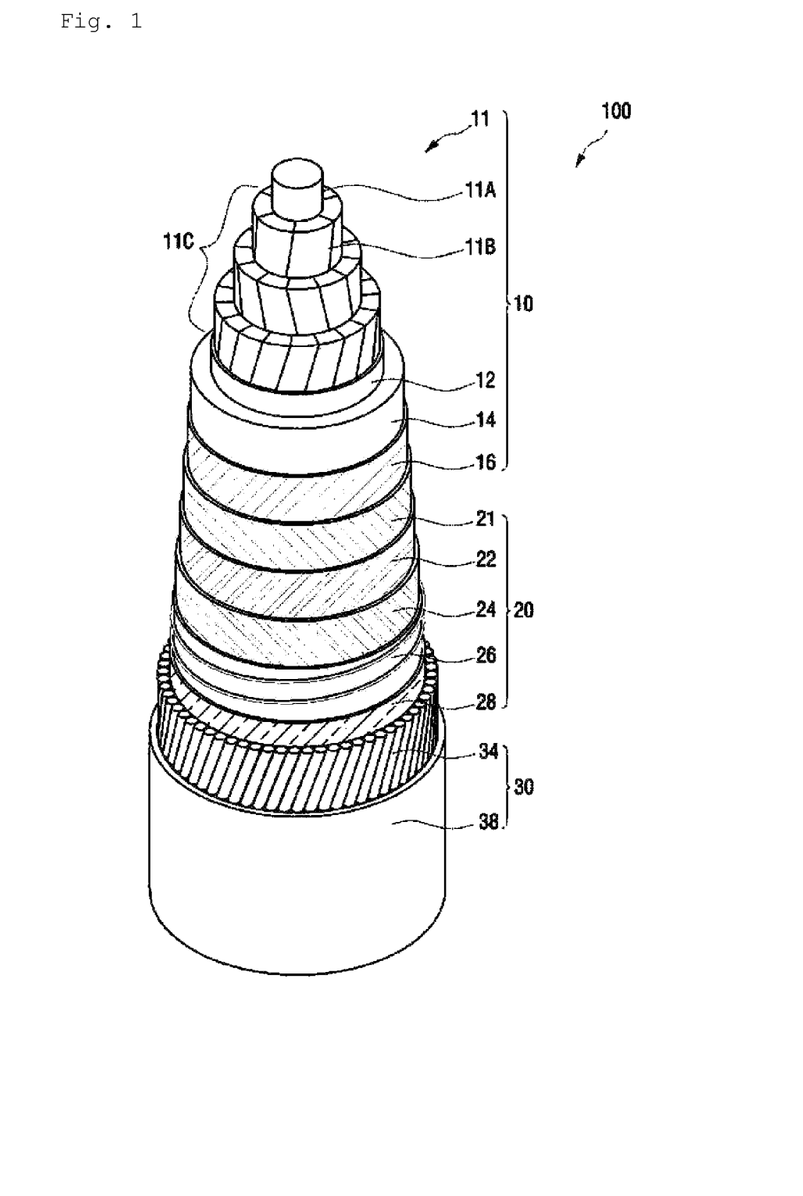
FIG. 1 is a cutaway perspective view of a submarine power cable which is an example of a power cable.

FIG. 1 is a cutaway perspective view of a submarine power cable 100 which is an example of a power cable.

Referring to FIG. 1, the submarine power cable 100 includes a cable core part 10 having a conductor 11, an inner semiconducting layer 12, a cable insulating layer 14, and an outer semiconducting layer 16, and configured to transmit power along the conductor 11 only in a longitudinal direction of the submarine power cable 100 and prevent leakage of current in a radial direction of the submarine power cable 100.

The conductor 11 acts as a path through which current flows to transmit power, and may be formed of a material, e.g., copper or aluminum, which has high conductivity to minimize power loss and has strength and flexibility appropriate to manufacture and use a cable.

As illustrated in FIG. 1, the conductor 11 may be a flat conductor 11 including a flat wire layer 11c consisting of a round central wire 11a and a flat wire 11b twisted to cover the round central line 11a, and having an overall round cross section. As another example, the conductor 11 may be a circular compressed conductor 11 obtained by twisting a plurality of round wires and compressing them into a circular shape. The flat conductor 11 has a higher space factor than that of the circular compressed conductor 11 and thus may contribute to reduction of an outer diameter of a cable.

Because the conductor 11 is formed by twisting a plurality of wires, a surface thereof is not smooth and thus an electric field may not be uniform and a corona discharge is likely to occur locally. When there is a gap between the surface of the conductor 11 and the cable insulating layer 14 described below, insulation performance may decrease.

In order to solve this problem, the inner semiconducting layer 12 may be provided outside the conductor 11. The inner semiconducting layer 12 may include an insulating material to which conductive particles such as carbon black, carbon nanotubes, carbon nanoplates, or graphite are added and thus may have a semiconductive property.

The inner semiconducting layer 12 may prevent a sudden change in an electric field between the conductor 11 and the cable insulating layer 14 described below, thereby stabilizing insulation performance. In addition, the inner semiconducting layer 12 may suppress a non-uniform charge distribution on a surface of the conductor 11 to achieve a uniform electric field, and prevent a gap between the conductor 11 and the cable insulating layer 14 to suppress a corona discharge, dielectric breakdown, etc.

The cable insulating layer 14 is provided outside the inner semiconducting layer 12 to electrically insulate the inner semiconducting layer 12 from the outside so that current flowing through the conductor 11 may not leak to the outside.

The cable insulating layer 14 may include insulating paper impregnated with insulating oil. That is, the cable insulating layer 14 may be formed by winding insulating paper in multiple layers to surround the inner semiconducting layer 12 and impregnating the insulating paper with insulating oil after the cable core part 10 is formed. As the insulating oil is absorbed by the insulating paper, insulating characteristics of the cable insulating layer 14 may be improved.

The insulating oil improves insulating characteristics when gaps in the insulating paper and gaps between layers generated by winding the insulating paper are filled with the insulating oil, and reduces a frictional force between the layers of the insulating paper when the power cable 100 is bent, thereby improving bendability of the power cable 100.

When insulating oil having relatively low viscosity is used, it is necessary to pressurize the insulating oil using oiling facility or the like to maintain a state in which the insulating paper is impregnated with the insulating oil and prevent gaps in the cable insulating layer 14 due to the flow of the insulating oil. However, when insulating oil having relatively high viscosity is used, a flow rate of the insulating oil is low and thus oiling facility is not needed to pressurize the insulating oil or the number of pieces of oiling facility may be reduced to increase a length of a cable to be extended. For example, at least one selected from the group consisting of naphthenic insulating oil, polystyrene insulating oil, mineral oil, alkyl benzene or polybutene synthetic oil, heavy alkylate, and the like may be used as the insulating oil.

The insulating paper may be Kraft paper obtained by removing organic electrolyte in Kraft pulp or composite insulating paper obtained by adhering Kraft paper onto one side or both sides of a plastic film.

Specifically, the cable insulating layer 14 may be formed by winding only Kraft paper and impregnating the Kraft paper with insulating oil. In this case, the insulating oil may flow in a direction in which load is applied to the power cable 100, thereby causing gaps. On the other hand, when the cable insulating layer 14 is formed by winding composite insulating paper and impregnating the composite insulating paper with the insulating oil, thermoplastic resin such as polypropylene resin is not impregnated with the insulating oil and may thermally expand according to an impregnation temperature during the manufacture of a cable or an operating temperature during an operation of the cable. When the thermoplastic resin thermally expands, surface pressure is applied to a plurality of pieces of stacked Kraft paper, thereby reducing a flow path of the insulating oil, thereby suppressing the flow of the insulating oil due to gravity or contraction/expansion of the insulating oil. In addition, the composite insulating paper has higher dielectric strength than that of Kraft paper and thus contribute to a reduction of an outer diameter of a cable.

When electric current is supplied to the power cable 100, the conductor 11 serving as a path through which the electric current flows is heated and the temperature thereof gradually reduces from an inner side thereof to an outer side thereof in the radial direction of the power cable 100, thereby causing a temperature difference in the cable insulating layer 14. Therefore, the insulating oil in the cable insulating layer 14 right above the conductor 11, i.e., on the inner semiconducting layer 12, reduces in viscosity and thermally expands and thus moves outwards. When a temperature of the power cable 100 reduces, the viscosity of the moving insulating oil increases and does not return to an original state and thus a gap may occur in a portion of the cable insulating layer 14 right above the conductor 11.

The outer semiconducting layer 16 may be provided outside the cable insulating layer 14. Similar to the inner semiconducting layer 12, the outer semiconducting layer 16 is formed of a material having a semiconductive property, e.g., an insulating material to which conductive particles such as carbon black, carbon nanotubes, carbon nanoplates, or graphite are added, to suppress a non-uniform charge distribution between the cable insulating layer 14 and the metal sheath 22 described below, thereby stabilizing insulation performance. In addition, the outer semiconducting layer 16 may planarize a surface of the cable insulating layer 14 to mitigate electric field concentration in the power cable 100, thus preventing a corona discharge, and physically protect the cable insulating layer 214.

The cable core part 10 may further include a moisture absorbing layer 21 to prevent moisture from penetrating the power cable 100. The moisture absorbing layer 21 may be provided between the twisted wires of the conductor 11 and/or outside the conductor 11, and provided in the form of powder, a tape, a coating layer, or a film containing a super absorbent polymer (SAP) capable of quickly absorbing moisture permeating the power cable 100 and maintaining a state of absorbing the moisture, thereby preventing permeation of moisture in a longitudinal direction of the power cable 100. In addition, the moisture absorbing layer 21 may have semiconductivity to prevent a sudden electric field change.

A cable protection part 20 may be provided outside the cable core part 10, and the power cable 100 may further include the cable armor 30 when laid at the bottom of the sea. The cable protection part 20 and the cable armor 30 protect the cable core part 10 from various environmental factors, such as moisture penetration, mechanical trauma, and corrosion, which may affect power transmission performance of the power cable 100.

The cable protection part 20 includes the metal sheath 22 and a polymer sheath 24 to protect the power cable 100 from fault current, external forces, and other external environmental factors.

The metal sheath 22 may be provided to surround the cable core part 10. In particular, when the power cable 100 is laid in an environment such as the sea bottom, the cable core part 10 may be sealed to prevent the permeation of foreign substances such as moisture thereinto, and a molten metal may be extruded on the outside of the cable core part 10 to make the cable core part 10 have seamless and continuous outer sides, thereby enhancing watertightness performance. The molten metal may be lead or aluminum, preferably, lead having excellent corrosion resistance to seawater when the power cable 100 is laid at the sea bottom, and more preferably, a lead alloy containing a metal element to reinforce mechanical properties. The metal sheath 22 may be grounded at an end of the power cable 100 to serve as a path through which fault current flows when an accident such as a ground fault or a short circuit occurs, protect the power cable 100 from external shocks, and prevent an electric field from being discharged to the outside of the power cable 100.

Furthermore, an anticorrosion compound, e.g., blown asphalt, may be applied onto a surface of the metal sheath 22 to additionally improve corrosion resistance, watertightness, etc. of the power cable 100 and improve adhesion to the polymer sheath 24.

Furthermore, a nonwoven copper wire tape and a moisture absorbing layer 21 may be additionally provided between the metal sheath 22 and the cable core part 10. The nonwoven copper wire tape includes copper wire, a nonwoven tape, and the like to facilitate electrical contact between the outer semiconducting layer 16 and the metal sheath 22. The moisture absorbing layer 21 is provided in the form of powder, a tape, a coating layer, a film or the like containing a super absorbent polymer (SAP) capable of quickly absorbing moisture permeating the power cable 100 and maintaining a state of absorbing the moisture to prevent penetration of moisture in the longitudinal direction of the power cable 100. In addition, the nonwoven copper wire tape and the moisture absorbing layer 21 may preferably have a semiconductive property to prevent a sudden change in an electric field, and the moisture absorbing layer 21 may include copper wire to be supplied with electric current and to absorb moisture.

The polymer sheath 24 may be provided outside the metal sheath 22 to improve corrosion resistance, watertightness, etc. of the power cable 100 and protect the power cable 100 from other external environmental factors such as mechanical trauma, heat, and ultraviolet rays. The polymer sheath 24 may be formed of a resin such as polyvinyl chloride (PVC) or polyethylene, and preferably, polyethylene resin having excellent watertightness when the power cable 100 is laid at the sea bottom and preferably, polyvinyl chloride (PVC) resin in an environment requiring flame retardancy.

The power cable 100 may include a metal strip layer 26 outside the polymer sheath 24 in the form of a galvanized steel tape or the like to prevent expansion of the metal sheath 22 due to expansion of the insulating oil. A bedding layer (not shown) formed of a semiconductive non-woven tape or the like may be provided on and/or below the metal strip layer 26 to buffer an external force applied to the power cable 100, and an outer sheath 28 formed of a resin such as polyvinyl chloride or polyethylene may be further provided to significantly improve corrosion resistance, watertightness, etc. of the power cable 100 and additionally protect the power cable 100 from other external environmental factors such as mechanical trauma, heat, ultraviolet rays, etc.

The power cable 100, when laid at the sea bottom, is likely to be damaged by the anchor of a ship, a bending force applied due to sea currents or waves, friction with the sea bottom, etc., and thus may further include the cable armor 30 outside the cable protection part 20 to prevent this problem.

The cable armor 30 may include a metal restoration layer 34 and a serving layer 38. The metal restoration layer 34 may be formed of steel, galvanized steel, copper, brass, bronze, or the like, formed by cross-winding wire having a round or flat cross-section in at least one layer, enhance mechanical properties and performance of the power cable 100, and additionally protect the power cable 100 from an external force.

The serving layer 38 formed of polypropylene yarn or the like may be provided in one or more layers on and/or below the metal restoration layer 34 to protect the power cable 100. The serving layer 38, which is an outermost layer, may be formed of two or more materials of different colors to secure visibility of the power cable 100 laid at the sea bottom.

Figure 2:
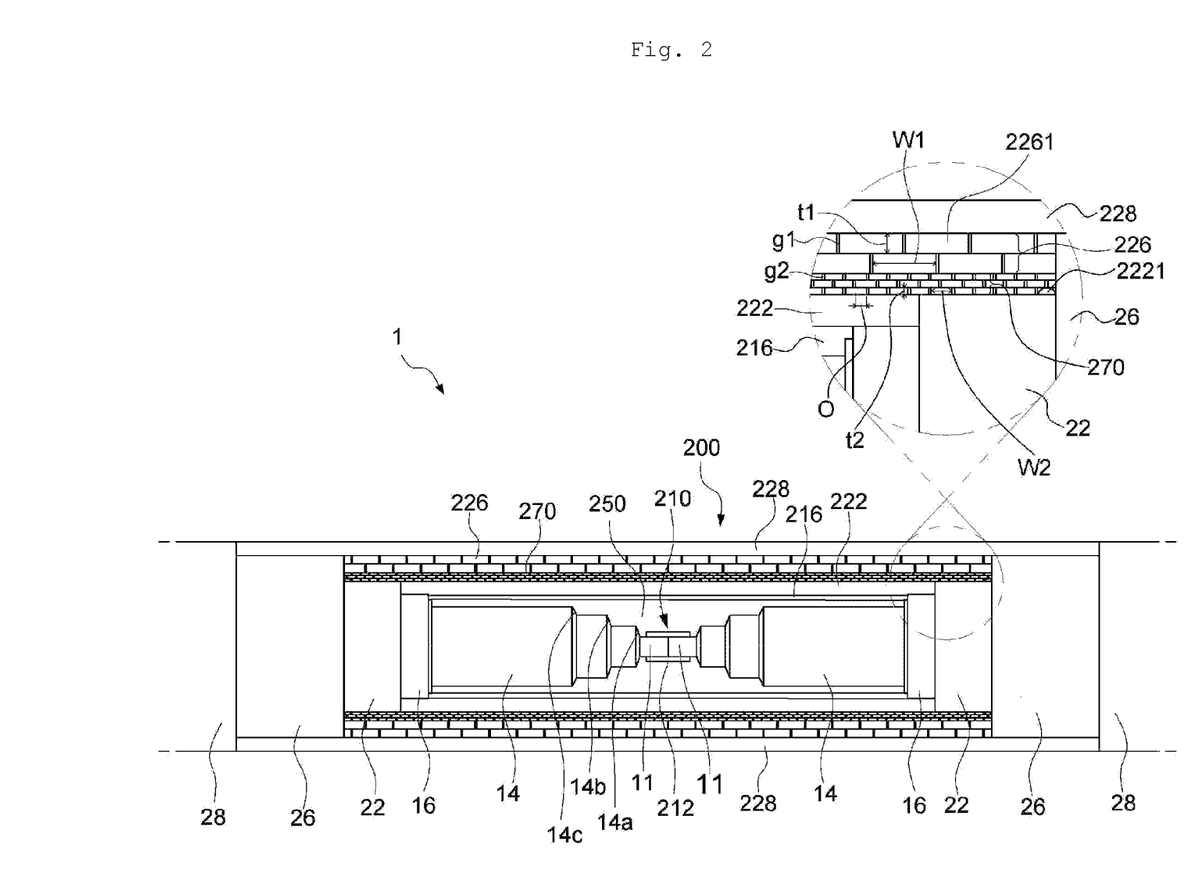
FIG. 2 is a cross-sectional view of a power cable joint system according to an embodiment of the present disclosure.

FIG. 2 is a cross-sectional view of a power cable joint system 1 according to an embodiment of the present disclosure.

In the power cable joint system 1 including a pair of power cables 100a and 100b and an intermediate connection part 200 for connection of the pair of power cables 100a and 100b, the power cables 100a and 100b each include a conductor 11, a cable insulating layer 14 disposed outside the conductor 11, an outer semiconducting layer 16 surrounding the cable insulating layer 14, a metal sheath 22 disposed outside the outer semiconducting layer 16, and a metal strip layer 26 disposed outside the metal sheath 22. In the intermediate connection part 200, the conductor 11, the cable insulating layer 14, the outer semiconducting layer 16, the metal sheath 22, and the metal strip layer 26 of each of the power cables 100a and 100b are exposed. The intermediate connection part 200 includes a conductor connection part 210 to which the conductors 11 of the pair of power cables 100a and 100b are connected, a reinforcing insulating layer 250 surrounding the conductor connection part 210 and at least a portion of the cable insulating layer 14, an outer semiconducting restoration layer 216 disposed outside the reinforcing insulating layer 250, a metal sheath restoration layer 222 disposed outside the outer semiconducting restoration layer 216, and a taping layer 270 provided to the perimeter of the metal sheath restoration layer 222.

The conductor connection part 210 for connecting the conductors 11 of the pair of the power cables 100a and 100b electrically and mechanically connects a pair of the exposed conductors 11 as shown in FIG. 2, and the pair of conductors 11 may be connected by inserting them into a conductor sleeve 212 and compressing them or by directly welding ends of the conductors 11 of the power cables 100a and 100b. For convenience of description, a case in which the conductor connection part 210 is configured using the conductor sleeve 212 will be described below.

As shown in FIG. 2, when the pair of the exposed conductors 11 are connected using the conductor sleeve 212, the conductor sleeve 212 may be configured such that an outer diameter thereof, when compressed, becomes substantially the same as those of the pairs of the exposed conductors 11, and an outer side of the conductor connection part 210 may be compressed after the conductor sleeve 212 is inserted into ends of the pair of the exposed conductors 11.

A thickness of the reinforcing insulating layer 250 described below may be reduced when the conductor connection part 210 is embodied as a same diameter conductor connection part 210 having an outer diameter substantially the same as those of the pair of conductors 11. Particularly, when a flexible joint or the like is configured, a total outer diameter of the intermediate connection part 200 may be substantially the same as the outer diameter of the power cable 100 when the reinforcing insulating layer 250 of the intermediate connection part 200 is configured to have the same outer diameter as that of an insulating layer of the power cable 100.

The exposed cable insulating layers 14 of the power cables 100a and 100b are penciled to have multi-step inclined surfaces 14a, 14b, and 14c as illustrated in FIG. 2 but may be penciled to have a single inclined surface. After the conductors 11 are connected through the conductor connection part 210, the reinforcing insulating layer 250 surrounding the conductor connection part 210 and the cable insulating layers 14 may be formed to allow current flowing through the conductors 11 and the conductor connection part 210 to flow only in a longitudinal direction of the joint system 1 and to prevent the current from leaking in a radial direction.

The reinforcing insulating layer 250 may be formed by winding insulating paper to surround the conductor connection part 210 and the exposed inner semiconducting layers (not shown) or the cable insulating layers 14, and the insulating paper used to form the reinforcing insulating layer 250 may be composite insulating paper having excellent dielectric strength.

In the intermediate connection part 200 of FIG. 2, the outer semiconducting restoration layer 216 may be provided outside the reinforcing insulating layer 250, as in the power cables 100a and 100b.

The metal sheath restoration layer 222 may be restored outside the outer semiconducting restoration layer 216. As described above, the metal sheaths 22 of the power cables 100a and 100b may prevent penetration of foreign substances such as moisture into the power cable power cables 100a and 100b, prevent loss of insulating oil, and be formed of a material such as a lead sheath as a sealing means to ensure sealing of the insulating oil, and in order to perform the above functions, a lead sheath tube may be disposed on the intermediate connection part 200, both ends of the lead sheath tube may be fixed onto the metal sheaths 22 of the power cables 100a and 100b by soldering (2221), and thereafter, the metal sheath restoration layer 222 of the intermediate connection part 200 may be completed using a tube reduction device (not shown) such as a tube reduction roller.

The metal sheath restoration layer 222 is difficult to be sealed against an internal pressure of the insulating oil and thus cannot be restored by spirally cross-winding a lead sheath tape or the like, and therefore, the lead sheath tube is used.

However, the lead sheath tube is used, a certain degree of gap is provided for installation and movement of the lead sheath tube, and there may be a crack or gap between the outer semiconducting restoration layer 216 and the metal sheath restoration layer 222 even when a tube reduction process is performed by the tube reduction device. In order to prevent damage to or deformation of the metal sheath restoration layer 222 due to the insulating oil flowing via the gap and inner expansion, the present disclosure may further employ a taping layer 270 configured to be provided to the perimeter of the metal sheath restoration layer 222 to prevent deformation of the metal sheath restoration layer 222.

The taping layer 270 may be configured to wrap or to be provided to the perimeter of the metal sheath restoration layer 222.

Alternatively, as shown in FIG. 2, the taping layer 270 may be configured to extend to an end of the metal sheaths 22 of the power cables 100a and 100b, as well as the metal sheath restoration layer 222.

Although the lengths of the exposed metal sheaths 22 for intermediate connection of the pair of power cables 100a and 100b of FIG. 2 are the same, the lengths or areas of the exposed metal sheaths 22 may be different from each other, because during an actual connection process of the power cables 100a and 100b, a lead sheath tube for configuration of the metal sheath restoration layer 222 is mounted in advance on the power cables 100a and 100b to be connected, moved to portions of the power cables 100a and 100b to be connected after connection or restoration of inner components, and the metal sheath restoration layer 222 is restored through tube reduction of the lead sheath tube.

Therefore, when some regions of the metal sheaths 22 exposed for intermediate connection of the power cables 100a and 100b are not wrapped with the taping layer 270, the regions may swell and thus may be wrapped with the binding tape 271, so that end regions of the metal sheaths 22 exposed during formation of the taping layer 270 may be bound with the binding tape 271.

That is, the taping layer 270 may be provided to the exposed metal sheaths 22 of the power cables 100a and 100b and the perimeter of the metal sheath restoration layer 222 to reinforce pressure-resistance performance of the metal sheaths 22 of the power cables 100a and 100b and the metal sheath restoration layer 222 of the intermediate connection part 200.

Because the ends of the metal sheaths 22 are also exposed during the formation of the intermediate connection part 200 and come into contact with the lead sheath, the ends of the metal sheaths 22 may be deformed due to internal pressure similar to the lead sheath and thus may be reinforced using the taping layer 270.

The binding tape 271 of the taping layer 270 is formed of a material such as a resin but may be reinforced using a FRP fiber or the like to have an excellent mechanical property.

By continuously providing the binding tape 271 to a surface of the metal sheath restoration layer 222, it is possible to suppress an additional inflow of the insulating oil or swelling of a surface of the metal sheaths 22 due to the insulating oil or internal expansion during use of the power cables 100a and 100b.

In addition, the binding tape 271 is preferably continuously provided to a surface of the metal sheath restoration layer 222 in a circumferential direction while forming gaps at predetermined intervals in a longitudinal direction of on an outer circumferential surface of the metal sheath restoration layer 222. The binding tape 271 may be provided in the form of rings spaced apart from each other or in a spiral form, as an example of a method of providing the binding tape 271 in the circumferential direction while forming gaps at the predetermined intervals in the longitudinal direction of the outer circumferential surface of the metal sheath restoration layer 222.

Because the binding tape 271 is limited in terms of a thickness, the taping layer 270 may be formed in multiple layers to sufficiently protect the metal sheath restoration layer 222 not to expand or deform. It was experimentally confirmed that the metal sheath restoration layer 222 was sufficiently protected when the taping layer 270 is formed in two to four layers.

As shown in FIG. 2, the taping layer 270 may be formed in multiple layers and binding tapes 271 constituting a layer of the taping layer 270 may be provided to a position appropriate to prevent a gap g2 in an adjacent layer of the taping layer 270.

The taping layer 270 may be provided in the form of rings or a spiral form on a location on the outer circumferential surface of the metal sheath restoration layer 222 to form a gap in the binding tapes 271 in the longitudinal direction of the metal sheath restoration layer 222, so that interference between the binding tapes 271 may be prevented, the flexibility of the metal sheaths 22 may be ensured, and a gap g2 in each of the binding tapes 271 may be blocked by an adjacent binding tape 271.

As shown in FIG. 2, a metal strip restoration layer 226 may be provided outside the metal sheath restoration layer 222.

Metal strips constituting the metal strip restoration layer 226 of FIG. 2 may have a thickness t1 and a width w1, the binding tapes 271 of the taping layer 270 may have a thickness t2 and a width w2, and the thickness t2 of the binding tapes 271 may be appropriately limited, because an outer diameter of a power cable, when the taping layer 270 including the binding tapes 271 is provided thereto, is greater than that of a power cable of the related art.

As shown in FIG. 2, the thickness t2 and the width w2 of the binding tape 271 are preferably smaller than the thickness t1 and the width w1 of the metal strips.

The gap G2 in each of the binding tapes 271 may be blocked by an adjacent binding tape 271 to prevent deformation, e.g., swelling, of the metal sheath restoration layer 222 even when an internal pressure of the metal sheath restoration layer 222 increases, thereby preventing damage to the metal sheath restoration layer 222.

In addition, it was confirmed that lifting of a connection part for adjustment of the gap g2 between the binding tapes 271 of each layer of the taping layer 270 was effectively prevented when a ratio o/w2 of a width o of regions of binding tapes 271, which overlap with each other without a gap, of each layer of the taping layer 270 to the width w2 of the binding layer 271 in a direction of a diameter of the power cable 100a or 100b was at least 25% to 35%.

After the taping layer 270 is added in multiple layers to the outside of the metal sheath restoration layer 222, the metal strip restoration layer 226 may be restored by cross-winding metal strips, and an outer sheath restoration layer 228 may be restored as illustrated in FIG. 2 in the case of an underground cable.

The intermediate connection part 200 of the present disclosure may include metal strips continuously wound around an upper portion of the taping layer 270.

As a concrete example, in the embodiment of FIG. 2, the metal strip layer 26 of the power cable 100 and the metal strip restoration layer 226 are illustrated as separate components, but the metal strip restoration layer 226 may be formed by restoring inner components by unwinding the metal strip layer 26 of the power cable 100, binding the taping layer 270, and rewinding metal strips during connection of power cables at a site. That is, the metal strip layer 26 of the power cable and the metal strip restoration layer 226 of the power cable joint system 1 may be continuously configured not to be distinguished from each other in appearance.

The outer sheath restoration layer 228 may be provided on an outer circumferential surface of the metal strip restoration layer 226, and formed in the form of a heat shrinkage tube of the same material as the outer sheath j28 of the power cable. In this case, in a method of mounting a heat shrinking tube to form the outer sheath restoration layer 228, the outer sheath restoration layer 228 may be formed by mounting the heat shrinkable tube at a side of one of power cables, moving the heat shrinkable tube to an intermediate connection part after restoration of the metal strip restoration layer 226, and heat-shrinking the heat shrinkable tube.

The heat shrinkable tube constituting the outer sheath restoration layer 228 may be formed in a size appropriate to cover an area wider than the entire metal strip restoration layer 226.

Because a submarine power cable includes a cable armor layer, the cable armor layer and the like may be additionally restored for intermediate connection of submarine power cables, thereby completing the intermediate connection part 200 in the form of a flexible joint.

FIG. 3 is a cross-sectional view of a power cable joint system 1 according to an embodiment of the present disclosure. A description of parts that are the same as those of FIG. 2 will be omitted here.

In the embodiment of FIG. 3, a taping layer 270b is further provided on an outer circumferential surface of a metal strip restoration layer 226.

The taping layer 270b on the outer circumferential surface of the metal strip restoration layer 226 may be formed of the same tape as a taping layer 270a disposed between a metal sheath restoration layer 222 and the metal strip restoration layer 226, and a redundant description is omitted here.

Because the metal strip restoration layer 226 is formed by unwinding and rewinding the metal strips of the power cable, a clearance and the like may occur during the rewinding of the metal strips and thus an outer circumferential surface of the metal strip restoration layer 226 may be wrapped again with the binding tape to significantly improve pressure-resistance performance of the metal sheath restoration layer 222 or the metal strip restoration layer 226.

When the taping layer 270b is additionally provided outside the metal strip restoration layer 226, the outer sheath restoration layer 228 may be provided outside the taping layer 270b to finish an intermediate connection part of an underground power cable as illustrated in FIG. 3 or an armor restoration layer may be provided to complete an intermediate connection part of a power cable if needed, as in the previous embodiment.

Figure 4:
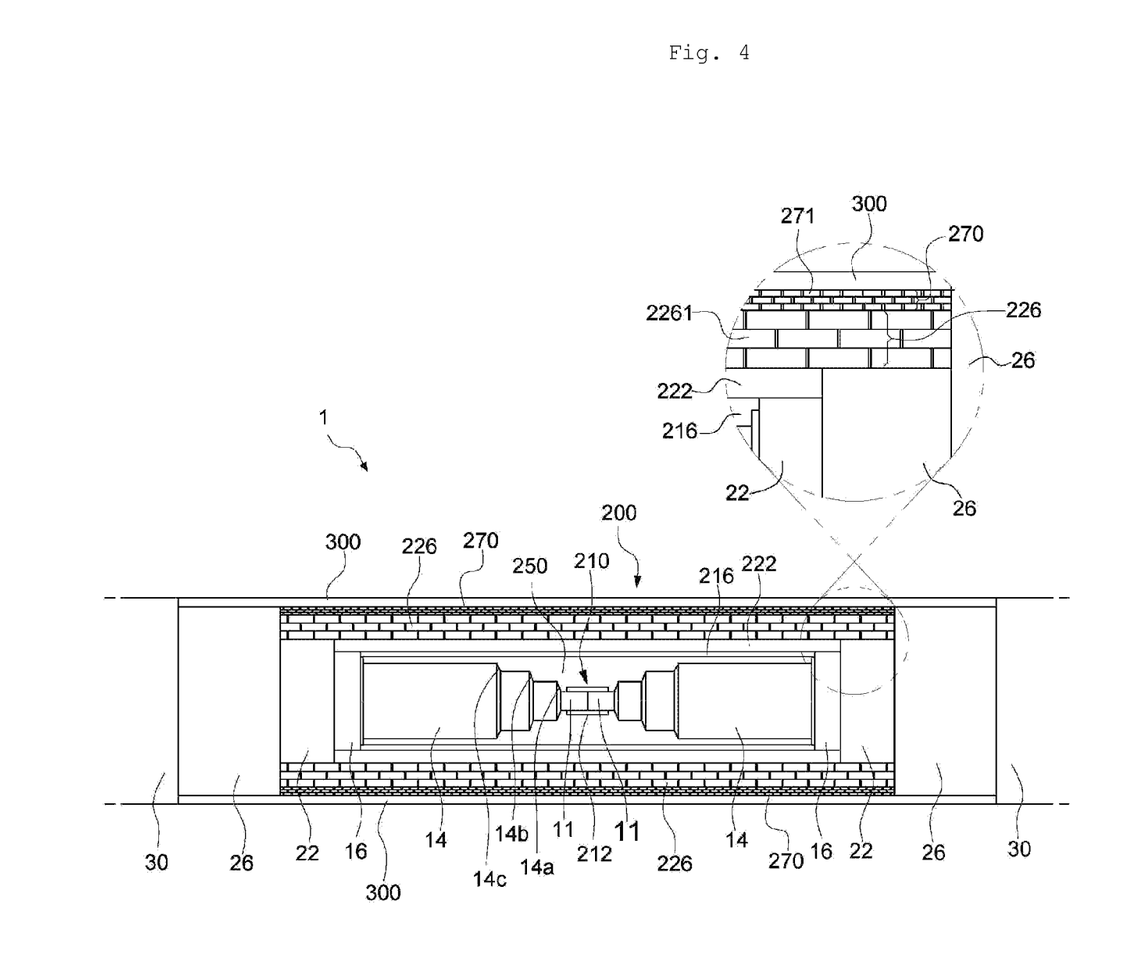
FIG. 4 is a cross-sectional view of a power cable joint system according to an embodiment of the present disclosure.

FIG. 4 is a cross-sectional view of a power cable joint system 1 according to an embodiment of the present disclosure. A description of parts that are the same as those described above with reference to FIGS. 2 and 3 will be omitted here.

The embodiment of FIG. 4 is the same as those of FIGS. 2 and 3 in that are commonly common in that a taping layer as described above is employed to improve pressure-resistance performance of a metal sheath restoration layer 222 or a metal strip restoration layer.

However, the embodiment of FIG. 4 is different from those of FIGS. 2 and 3 in that a taping layer is omitted between the metal sheath restoration layer 222 and a metal strip restoration layer 226 and is provided only on an outer circumferential surface of the metal strip restoration layer 226.

It is preferable that a diameter of the intermediate connection part 200 including the taping layer 270 (a diameter of a joint system) does not exceed 105% of a diameter of a cable when winding of connected power cables around a bobbin or a turntable is considered. Accordingly, when the taping layer 270 including the binding tapes 271 is added, pressure-resistance performance of the intermediate connection part near a metal sheath of may be improved, but when the taping layer 270 is added to multiple locations as illustrated in FIG. 3, an outer diameter of an intermediate connection part may increase. The metal strip restoration layer 226 is formed by unwinding and rewinding metal strips of a power cable for intermediate connection and thus a clearance may occur during the rewinding of the metal strips. Therefore, the taping layer may be added to only the outside of a metal strip restoration layer, so that an increase in an outer diameter of the intermediate connection part may be minimized and the metal strips may be bound at once to cover a metal sheath and metal strips covering the metal sheath so as to reinforce pressure-resistance performance.

When the taping layer 270 is provided only outside the metal strip restoration layer 226, the outer sheath restoration layer 228 may be provided outside the taping layer 270b as illustrated in FIG. 3, thereby finishing an intermediate connection part of an underground power cable. Otherwise, as illustrated in FIG. 4, in order to sufficiently protect the rigidity of an intermediate connection part of a submarine power cable in a harsh submarine environment, the intermediate connection part may include an armor restoration layer 300, which includes a connection wire for connection of armor wires of the power cable and a serving restoration layer, outside the metal strip restoration layer 226 as needed, thereby completing an intermediate connection part of a submarine power cable.

As described above with reference to FIG. 1, a pair of power cables may include armor wires outside metal strips or an outer sheath and a serving layer outside the armor wires to protect the cables in a submarine environment; and in an intermediate connection part, armor wires are fastened or bound through a connection wire, and an armor restoration layer having a structure similar to that of a serving layer of a submarine power cable may be formed outside the connection wire by a method of forming a serving restoration layer consisting of polypropylene yarn or the like, thereby sufficiently protecting the intermediate connection part from external shocks in a harsh submarine environment.

Figure 5:
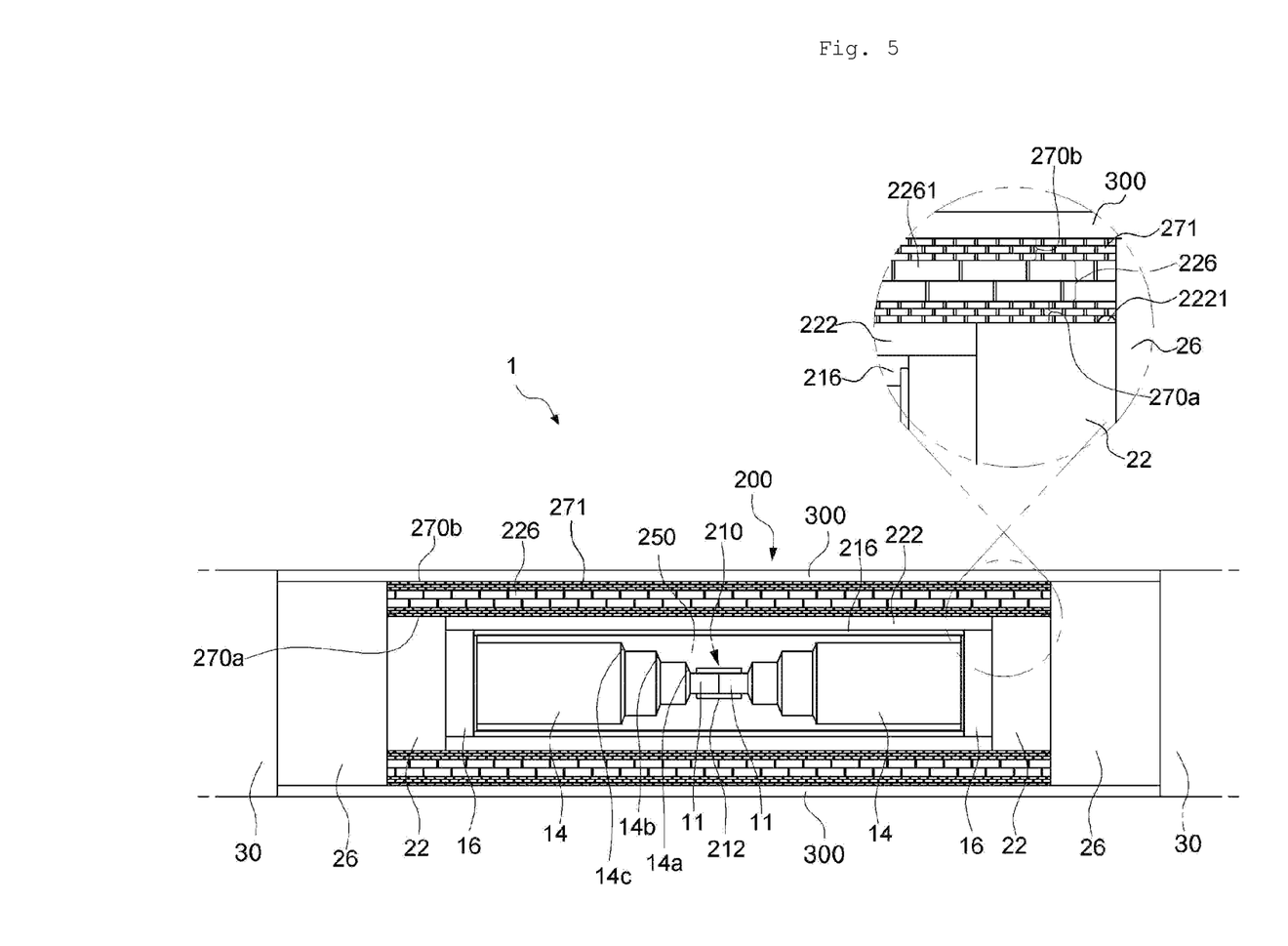
FIG. 5 is a cross-sectional view of a power cable joint system according to an embodiment of the present disclosure.

FIG. 5 is a cross-sectional view of a power cable joint system 1 according to an embodiment of the present disclosure.

In the embodiment of FIG. 5, taping layers 270a and 270b may be respectively provided on an outer circumferential surface of a metal sheath restoration layer 222 and an outer circumferential surface of a metal strip restoration layer 226 to improve pressure-resistance performance of the metal sheath restoration layer 222 and the metal strip restoration layer 26, thereby minimizing deformation or a clearance, as illustrated in FIG. 3.

In addition, in the embodiment of FIG. 5, an intermediate connection part further includes an armor restoration layer, which includes a connection wire for connecting the armor wires of the power cables and a serving restoration layer, outside the metal strip restoration layer 226, similar to the intermediate connection part of FIG. 4, thereby making the intermediate connection part having the same structure as a submarine power cable.

According to the power cable joint system 1 according to the present disclosure, the expansion or deformation of the metal sheath restoration layer 222 due to heat generated in a connection part of conductors of a pair of power cables connected through a joint box of a power cable may be prevented, and a thickness of a taping layer is not large, thus minimizing an increase a thickness of an intermediate connection part, and the flexibility, reliability, stability, and durability of the power cable joint system 1 may be improved.

While the present disclosure has been described above with respect to exemplary embodiments thereof, it would be understood by those of ordinary skill in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A power cable joint system comprising a pair of power cables and an intermediate connection part for connection of the pair of power cables,
   wherein each of the pair of power cables comprises: a conductor; a cable insulating layer disposed outside the conductor; an outer semiconducting layer surrounding the cable insulating layer; a metal sheath disposed outside the outer semiconducting layer; and a metal strip layer disposed outside the metal sheath, and the conductor, the cable insulating layer, the outer semiconducting layer, the metal sheath, and the metal strip layer of each of the pair of power cables are exposed in the intermediate connection part, and
   the intermediate connection part comprises: a conductor connection part to which the conductor of each of the pair of power cables are connected; a reinforcing insulating layer surrounding the conductor connection part and at least a portion of the cable insulating layer; an outer semiconducting restoration layer disposed outside the reinforcing insulating layer; a metal sheath restoration layer disposed outside the outer semiconducting restoration layer; and a taping layer provided to a perimeter of the metal sheath restoration layer.

2. The power cable joint system of claim 1, wherein the taping layer comprises a taping layer configured to be provided to the metal sheath restoration layer and at least a portion of the perimeter of the exposed metal sheath of each of the pair of power cables.

3. The power cable joint system of claim 1, wherein the taping layer is formed by providing a fiber reinforced tape in a circumferential direction while forming gaps at predetermined intervals in a longitudinal direction of an outer circumferential surface of the metal sheath restoration layer.

4. The power cable joint system of claim 3, wherein the taping layer is formed by providing the fiber reinforced tape in the form of rings or a spiral form.

5. The power cable joint system of claim 3, wherein the taping layer is formed in two to four layers.

6. The power cable joint system of claim 5, wherein fiber reinforced tapes constituting one of the layers of the taping layer are provided to a location appropriate to block a gap between layers of the taping layer adjacent in a vertical direction.

7. The conductor connection structure of claim 6, wherein a gap between the fiber reinforced tapes corresponding to the layers of the taping layer is adjusted such that a ratio of a width of regions of the fiber reinforced tapes, which overlap each other without a gap, to a width of the fiber reinforced tapes in a direction of a diameter of the power cable is in a range of 25% to 35%.

8. The power cable joint system of claim 1, wherein the taping layer is provided to continuously cover ends of the metal sheaths, which are exposed for intermediate connection, of the pair of power cables and the outer circumferential surface of the metal sheath restoration layer.

9. The power cable joint system of claim 1, wherein the intermediate connection part further comprises a metal strip restoration layer including metal strips constituting the metal strip layer and continuously wound around an upper portion of the taping layer.

10. The power cable joint system of claim 9, wherein, in the intermediate connection part, the taping layer including the fiber reinforced tape is provided to an outer circumferential surface of the metal strip restoration layer.

11. The power cable joint system of claim 9, wherein the intermediate connection part further comprises an outer sheath restoration layer, which uses a thermal contraction tube, outside the metal strip restoration layer.

12. The power cable joint system of claim 11, wherein an outer diameter of the intermediate connection part of the power cable joint system is 1.05 times or less than that of the power cable.

13. The power cable joint system of claim 9, wherein the pair of power cables each further comprise a cable armor outside the metal strips or the outer sheath, the cable armor including armor wires and a serving layer outside the armor wire, and the intermediate connection part further comprises an armor restoration layer outside the metal strip restoration layer or the outer sheath restoration layer, the armor restoration layer including a connection wire for connecting the armor wires of the pair of power cables and a serving restoration layer.

14. The power cable joint system of claim 1, wherein a fiber reinforced tape constituting the taping layer comprises a fiber reinforced tape formed of a resin material to which an FRP fiber is added.

15. A power cable joint system comprising a pair of power cables and an intermediate connection part for connection of the pair of power cables, wherein each of the pair of power cables comprises: a conductor; a cable insulating layer disposed outside the conductor; an outer semiconducting layer surrounding the cable insulating layer; a metal sheath disposed outside the outer semiconducting layer; and a metal strip layer disposed outside the metal sheath, wherein the conductor, the cable insulating layer, the outer semiconducting layer, the metal sheath, and the metal strip layer of each of the pair of power cables are exposed in the intermediate connection part, and the intermediate connection part comprises: a conductor connection part to which connectors of the pair of power cables are connected; a reinforcing insulating layer surrounding the conductor connection part and at least a portion of the cable insulating layer; and outer semiconducting restoration layer outside the reinforcing insulating layer; a metal sheath restoration layer outside the outer semiconducting restoration layer; metal strips used to form metal strip restoration layers of the pair of power cables and continuously wound around an upper portion of the metal sheath restoration layer; and a taping layer provided to an outer circumferential surface of the metal strip restoration layer.

16. The power cable joint system of claim 15, wherein the taping layer is formed by providing a fiber reinforced tape in a circumferential direction while forming gaps at predetermined intervals in a longitudinal direction of an outer circumferential surface of the metal sheath restoration layer.

17. The insulating composition of claim 16, wherein the taping layer is formed by providing a fiber reinforced tape in the form of rings or a spiral form.

18. The power cable joint system of claim 16, wherein the taping layer is formed in two to four layers.

19. The power cable joint system of claim 18, wherein fiber reinforced tapes constituting one of the layers of the taping layer are provided to a location appropriate to block a gap between layers of the taping layer adjacent in a vertical direction.

20. The power cable joint system of claim 19, wherein a gap between the fiber reinforced tapes corresponding to the layers of the taping layer is adjusted such that a ratio of a width of regions of the fiber reinforced tapes, which overlap each other without a gap, to a width of the fiber reinforced tapes in a direction of a diameter of the power cable is in a range of 25% to 35%.

* * * * *